No. 866,675. PATENTED SEPT. 24, 1907.
W. Q. OLDEN.
CAR BRAKE.
APPLICATION FILED DEC. 12, 1906.
3 SHEETS—SHEET 1.
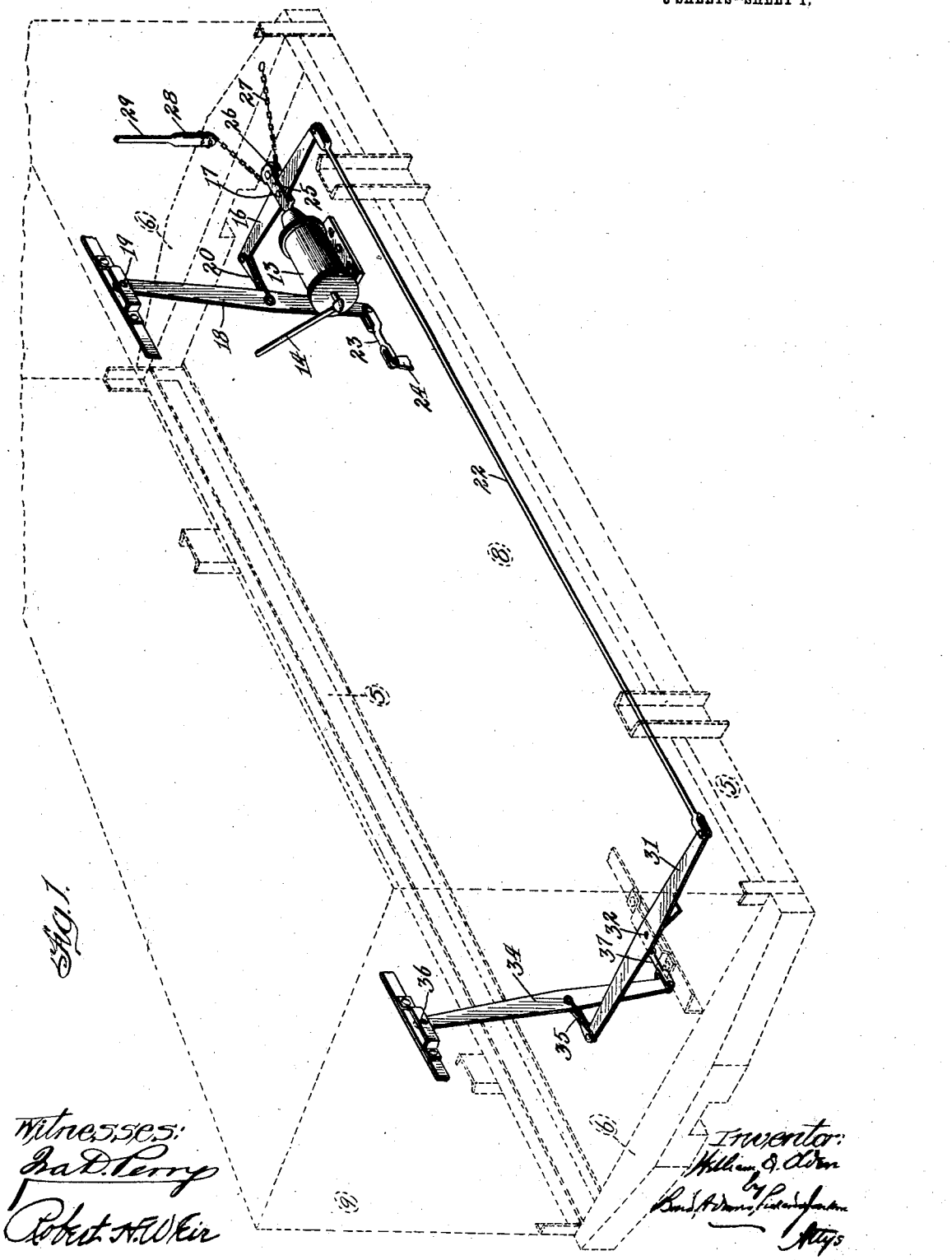

No. 866,675.
PATENTED SEPT. 24, 1907.
W. Q. OLDEN.
CAR BRAKE.
APPLICATION FILED DEC. 12, 1906.
3 SHEETS—SHEET 2.
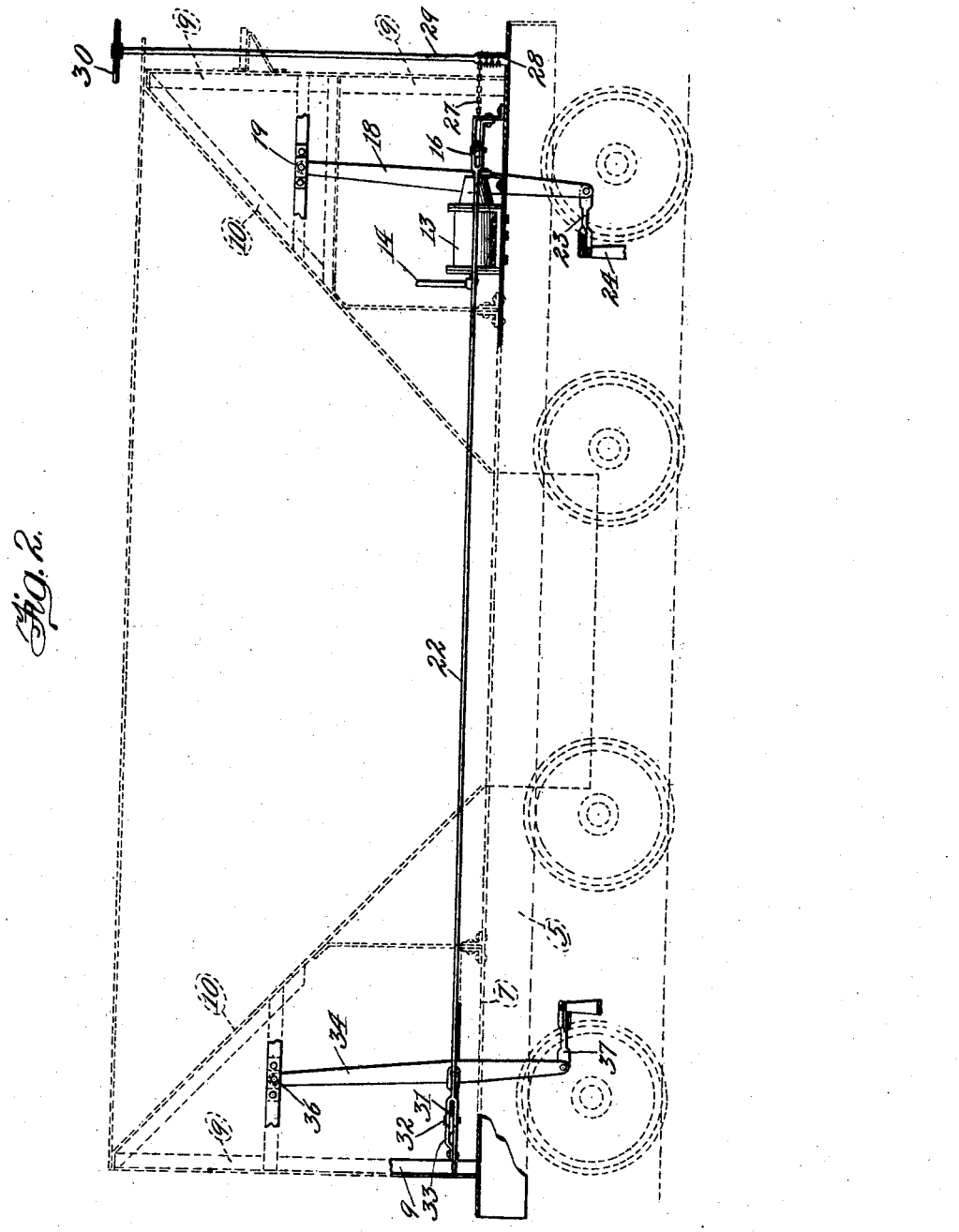

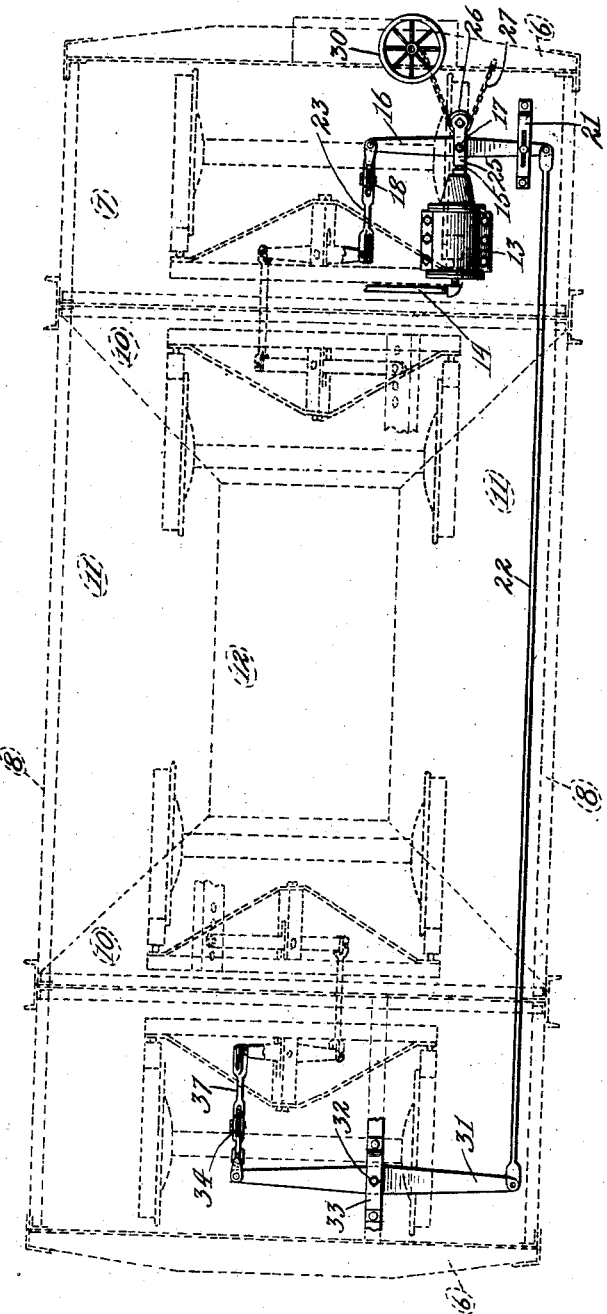

UNITED STATES PATENT OFFICE.

WILLIAM Q. OLDEN, OF CHICAGO, ILLINOIS, ASSIGNOR OF ONE-HALF TO HIMSELF AND ONE-HALF TO ROBERT B. CAMPBELL, OF JOLIET, ILLINOIS.

CAR-BRAKE.

No. 866,675.      Specification of Letters Patent.      Patented Sept. 24, 1907.

Application filed December 12, 1906. Serial No. 347,472.

*To all whom it may concern:*

Be it known that I, WILLIAM Q. OLDEN, a citizen of the United States, residing at Chicago, in the county of Cook, State of Illinois, have invented certain new and useful Improvements in Car-Brakes, of which the following is a specification, reference being had to the accompanying drawings.

This invention relates to improvements in car brakes, and it relates particularly to an arrangement and construction of braking apparatus designed primarily for use in connection with dump cars. In dump cars it is highly desirable that the entire space beneath the central portion of the car be left entirely clear of operating mechanism of every description, so that there shall be offered no obstruction whatever to the dumping of material from the car. This is desirable not only that the load may be freely and readily discharged, but also that no part of the operating mechanism may be damaged by the material discharged from the car.

It is the object of my invention to provide a construction that will permit of as effective operation of the system of brake levers employed as is now the case, but which will leave the space beneath the central portion of the car absolutely unobstructed by any portion of the brake actuating mechanism.

I accomplish this object by the devices and combinations of devices shown in the drawings and hereinafter specifically described. That which I believe to be new will be pointed out in the claims.

In the accompanying drawings I have indicated by broken lines the outline of a dump car, an ordinary construction and arrangement of brake levers and brake beams, while in full lines I have indicated the parts that serve to particularly point out an embodiment of my invention.

Figure 1 is a perspective view, showing the construction and arrangement of the parts combined to carry out my invention; Fig. 2 is a side elevation of the same; and, Fig. 3 is a top or plan view, the depending lever at each end of the car being, however, shown in section.

In the several figures of the drawings, in which corresponding parts are indicated by like reference characters, 5 indicates the side sills and 6 the end sills of a dump car upon which rests and is suitably secured a plate 7 in which is formed a central opening 12 through which the material in the car is discharged. 8 indicates the sides of the car, and 9 the ends. 10 indicates a sharply-sloping floor section leading from each end of the car toward the center. 11 indicates sloping floor sections at the sides of the car. These various floor sections lead to the large central opening 12, such opening 12 being normally closed by swinging doors of any approved construction and operating in any well-known manner. The parts so far referred to may be of any desired construction.

13 indicates an air cylinder, to which air is supplied from the engine of the train to which the car is attached, through the pipe 14. This cylinder, in the construction shown, is located above the sills of the car and is bolted or otherwise rigidly attached to the supporting frame of the car—in the construction shown it being bolted to the plate 7. Within this cylinder 13 is, of course, a piston, as usual, to which piston is connected the piston rod 15.

16 indicates a horizontally-disposed lever pivotally connected at 17 with the piston rod 15.

18 indicates a depending lever pivoted at 19 at its upper end to a suitable fixed support. Through links 20 this depending lever 18 is pivotally connected to the inner end of the transverse horizontally-disposed lever 16.

21 indicates a guide of any suitable construction secured to the plate 7, in which guide the outer end of the horizontally-arranged lever 16 projects and within the limits of which guide such lever 16 is free to move. To the outer end of this lever 16 beyond the said guide 21 is pivotally attached at one end a connecting rod 22 through which the brake mechanism at the opposite end of the car is set in motion.

23 indicates a link pivoted at one end to the lower end of the depending lever 18 and at its other end pivotally attached to the upper end of another and shorter lever 24 that is suitably connected at its lower end to one of a series of levers that are so arranged with reference to each other that, upon the application of power thereto, they will set the brakes against the wheels at that end of the car. Various forms and arrangements of these last-mentioned levers and the brake beams connected therewith may be employed. In Fig. 3, I have shown in broken lines a well-known type of such devices, and, as the construction and operation are well understood, I do not deem it necessary to enter into a detailed description.

25 indicates a clip embracing the horizontal lever 16 near the center of such lever, said clip carrying at its outer end a small pulley 26, around which passes a chain 27, one end of which is made fast, in the construction shown, to the adjacent end sill of the car, and the other end of which is wound around the enlarged lower end or drum 28 of the brake shaft 29, to the upper end of which is attached, as usual, a hand-wheel 30.

The rod 22 before mentioned, which is pivotally attached at one end to the horizontal lever 16, extends longitudinally of the car and slightly above and adjacent to one of the side sills 8, and is pivotally attached at its other end to a horizontally-arranged lever 31 which is pivoted at or near its central portion at 32 to a suitable fixed support 33. This horizontal lever 31 corresponds in function to the horizontal lever 16, in that it is connected to a depending lever corresponding to the lever 18 through which a system of brake levers carried by the truck at that end of the car can be set in operation. This lever 31 is longer than the lever 16, and has its inner end substantially as much to one side of the longitudinal center of the car as the inner end of the lever 16 is to the other side of such central line. By thus making the lever 31 long enough to so extend beyond the longitudinal center of the car, its inner end will be brought to proper position to enable it to be suitably connected up with and actuate the usual system of brake levers at that end of the car.

34 indicates a depending lever corresponding in construction and arrangement with the lever 18, and connected to the inner end of the long horizontal lever 31 by links 35 that correspond to the links 20 that connect the two levers 16 and 18. The pivotal point of this lever 34 is indicated by 36. At its lower end it is provided with a link 37 corresponding to the link 23 at the lower end of the lever 18, which link 37 is pivotally attached to a lever that corresponds exactly to the lever 24, and which, like said lever 24, is suitably connected to one of a series of ordinary brake levers such as shown.

With the devices constructed and arranged as shown, when it is desired to apply the brakes the horizontal transversely-extending lever 16 will be moved outward toward the end of the car, such movement being compelled by the movement of the piston in the cylinder 13 in the usual manner, or by the winding up of the chain 27 on the drum 28 of the brake shaft when the brakes are to be set by hand. This movement of the lever 16, whether by air pressure or by hand, will, through the links 20, cause the lever 18 to turn on its pivot 19, and, through the connection of such depending lever 18 with the ordinary system of brake levers at that end of the car, will cause such levers to move in the usual manner to set the brakes. It is evident that the moving of the outer end of the lever 16 toward the adjacent end of the car will exert a pull on the rod 22, which pull is transmitted through the longer horizontal transversely-disposed lever 31, and that by reason of the connection of the lever 31 with the depending lever 34 such last-named lever will be pulled back, and, inasmuch as the lever 34 is connected to the system of brake levers at that end of the car, the brakes at such end will also be set.

As I have before explained, various arrangements of brake levers are now employed beneath the car, and any of these well-known systems may be employed in connection with my invention. By my invention I am enabled to locate the devices to which the power is initially applied above the supporting frame work of the car in position to be at all times readily accessible for the purpose of inspection or repairs.

In my improved construction, it will be noted that I am able to make the depending levers of very considerable length and pivot them at their upper ends at a very considerable height above the sills of the car. I thus obtain great leverage, and am able quickly and powerfully to apply the brakes at both ends of the car. Furthermore, by employing the construction described, I am able to dispense entirely with all apparatus and connections of every kind that ordinarily extend beneath the central portion of the car. In lieu of such obstructing construction, I employ the longitudinally-extending rod 22 at one side of the car and adjacent to one of the sills. Such connecting rod 22, when employed in connection with a dump car having sloping sides, will be beneath one of such sides and therefore not liable to injury.

What I claim as my invention and desire to secure by Letters Patent is—

1. In a car, the combination with a system of brake-levers beneath the car-body, of a depending lever pivotally connected at its lower end with such system of levers and pivotally attached at its upper end above the sills of the car, another lever extending transversely of the car, means for connecting said last two levers, and means connected with said transversely-extending lever for operating said levers and through them said system of brake-levers.

2. In a car, the combination with a system of brake-levers beneath the car-body, of a depending lever pivotally connected at its lower end with such system of levers and pivotally attached at its upper end above the sills of the car, another lever adapted to move in a plane substantially at right angles to the plane in which said depending lever moves, and means connected with said second named lever for operating it and said depending lever and through them the said system of brake-levers.

3. In a car, the combination with a system of brake-levers beneath the car-body near each end of the car, of a depending lever near each end of the car, each of said levers being pivotally connected at its lower end with one of such systems of brake-levers and pivotally attached in place above the sills of the car, means for connecting said two depending levers, and means connected with one of said levers for moving said levers and through them setting in operation said two systems of brake-levers.

4. In a car, the combination with a system of brake-levers beneath the car-body near each end of the car, of a depending lever near each end of the car, each of said levers being pivotally connected at its lower end with one of such systems of brake-levers and pivotally attached in place above the sills of the car, means for connecting said two depending levers together, such connecting means comprising a rod at one side of the car adjacent to one of the side sills of the car, and means connected with one of said levers for moving said levers and through them setting in operation said two systems of brake-levers.

5. In a car, the combination with a system of brake-levers beneath the car-body near each end of the car, of a depending lever near each end of the car, each of said levers being pivotally connected at its lower end with one of such systems of brake-levers and pivotally attached in place above the sills of the car, a lever at each end of the car arranged to move in a plane substantially at right angles to the plane in which the said depending levers move, a rod connecting said last described levers, said rod lying at one side of the car adjacent to one of the side sills of the car, connections between the said depending levers and the other described levers, and means for applying power to one of said last-described levers.

WILLIAM Q. OLDEN.

Witnesses:
MINNIE A. HUNTER,
ALBERT H. ADAMS.